(12) United States Patent
Autran

(10) Patent No.: US 12,348,886 B2
(45) Date of Patent: Jul. 1, 2025

(54) LIGHTING DEVICE AND IMAGING DEVICE COMPRISING SUCH A LIGHTING DEVICE

(71) Applicant: VALEO COMFORT AND DRIVING ASSISTANCE, Créteil (FR)

(72) Inventor: Frederic Autran, Créteil (FR)

(73) Assignee: VALEO COMFORT AND DRIVING ASSISTANCE, Créteil (FR)

(*) Notice: Subject to any disclaimer, the term of this patent is extended or adjusted under 35 U.S.C. 154(b) by 176 days.

(21) Appl. No.: 18/268,468

(22) PCT Filed: Dec. 16, 2021

(86) PCT No.: PCT/EP2021/086318
§ 371 (c)(1),
(2) Date: Jun. 20, 2023

(87) PCT Pub. No.: WO2022/129419
PCT Pub. Date: Jun. 23, 2022

(65) Prior Publication Data
US 2024/0040280 A1 Feb. 1, 2024

(30) Foreign Application Priority Data
Dec. 17, 2020 (FR) ...................................... 2013410

(51) Int. Cl.
*H04N 25/77* (2023.01)
*F21V 8/00* (2006.01)
*H04N 25/11* (2023.01)
*H04N 25/78* (2023.01)

(52) U.S. Cl.
CPC ........... *H04N 25/77* (2023.01); *G02B 6/0005* (2013.01); *H04N 25/11* (2023.01); *H04N 25/78* (2023.01)

(58) Field of Classification Search
None
See application file for complete search history.

(56) References Cited

U.S. PATENT DOCUMENTS
2017/0307164 A1  10/2017  Atoji

FOREIGN PATENT DOCUMENTS
EP    3258746 A2    12/2017

OTHER PUBLICATIONS

International Search Report and Written Opinion in corresponding International Application No. PCT/EP2021/086318, dated Feb. 22, 2022 (17 pages).

*Primary Examiner* — Mark T Monk
(74) *Attorney, Agent, or Firm* — Osha Bergman Watanabe & Burton LLP

(57) ABSTRACT

A lighting device comprising a lighting module including an optical output configured to emit a light beam having an angular spread. The module has a light source configured to generate the light beam and an optical diffuser arranged to receive and diffuse the beam towards the optical output, such that the downstream value is greater than the upstream value of the angular spread. A control module emits a control signal having an alarm value when the value of the angular spread of the light beam emitted by the optical output passes below a first threshold, the control module comprising a photoreceptor optically coupled to the optical output and configured to measure a light intensity. The control module outputs the control signal having the alarm value when the value of the light intensity falls below a second threshold. A control circuit deactivates the light source upon reception of the control signal.

11 Claims, 4 Drawing Sheets

[Fig. 1]
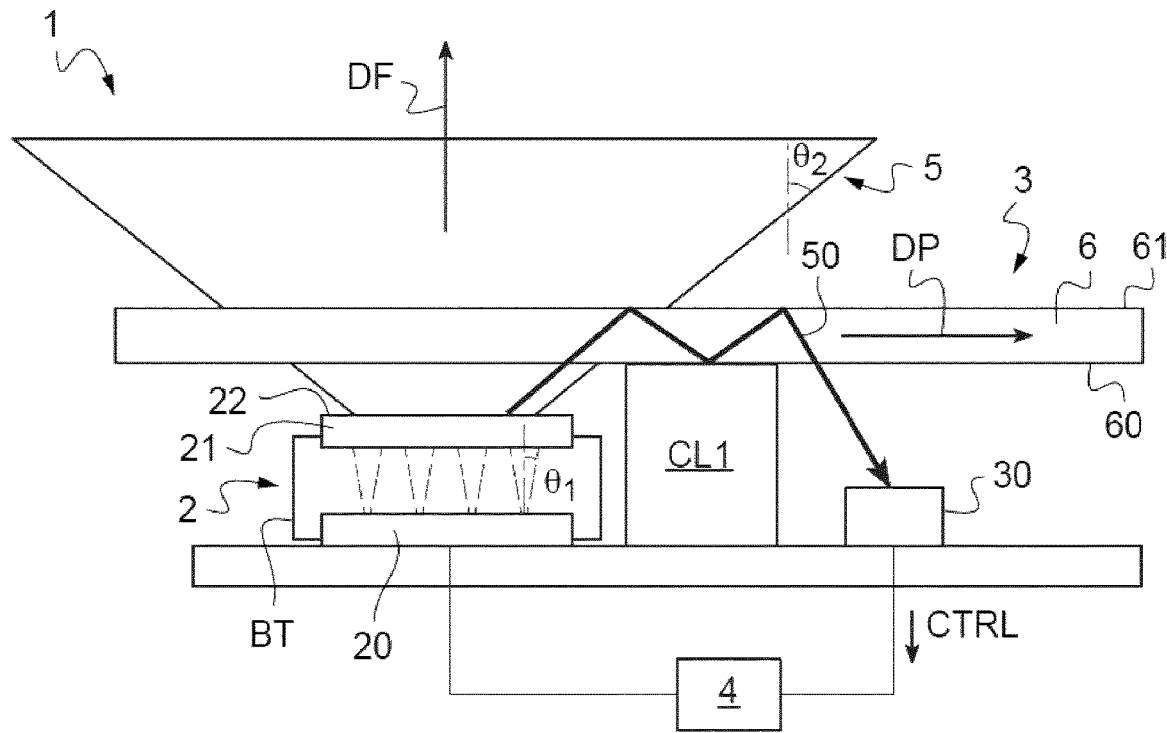
[Fig. 2]
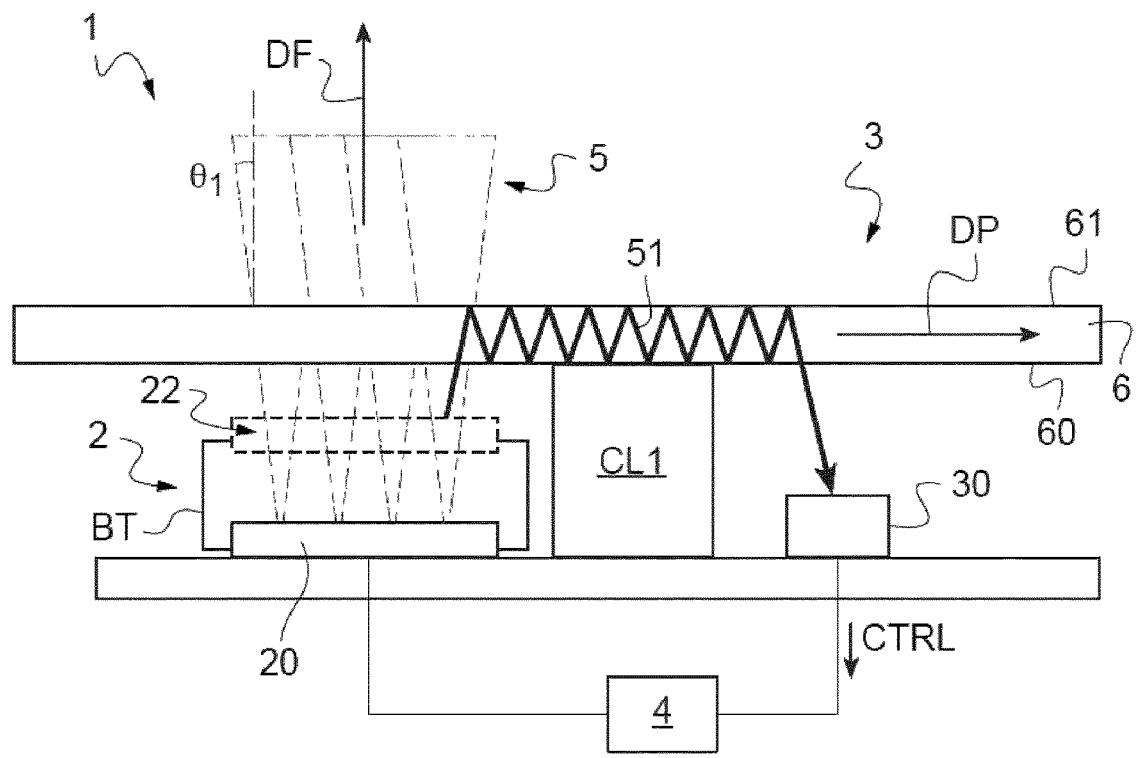

[Fig. 3]
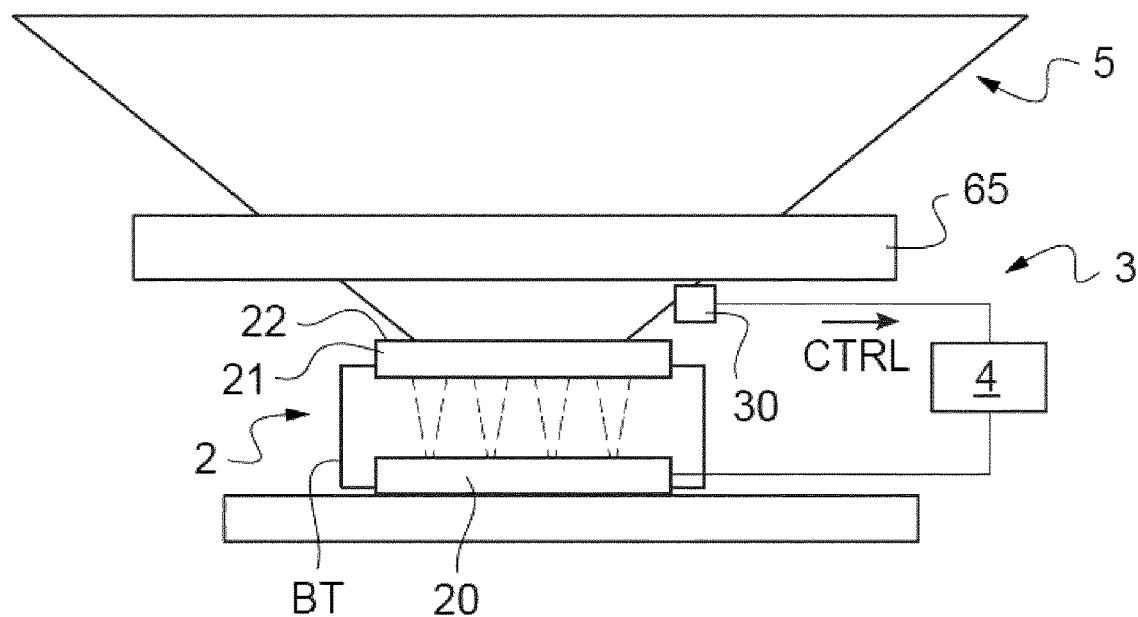
[Fig. 4]
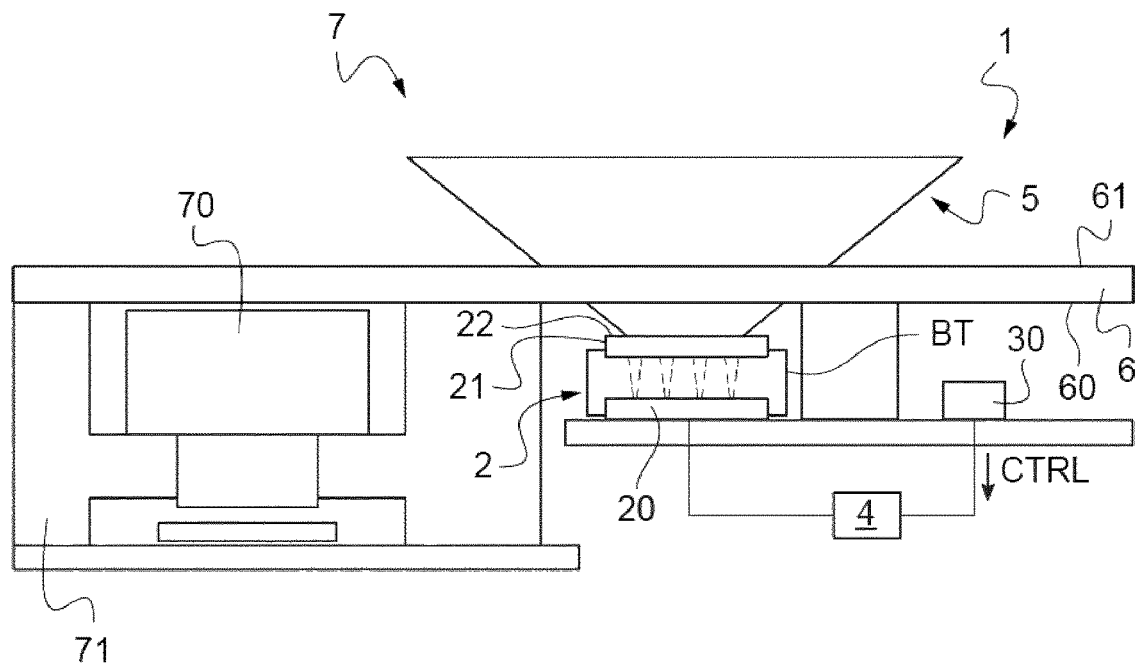

[Fig. 5]
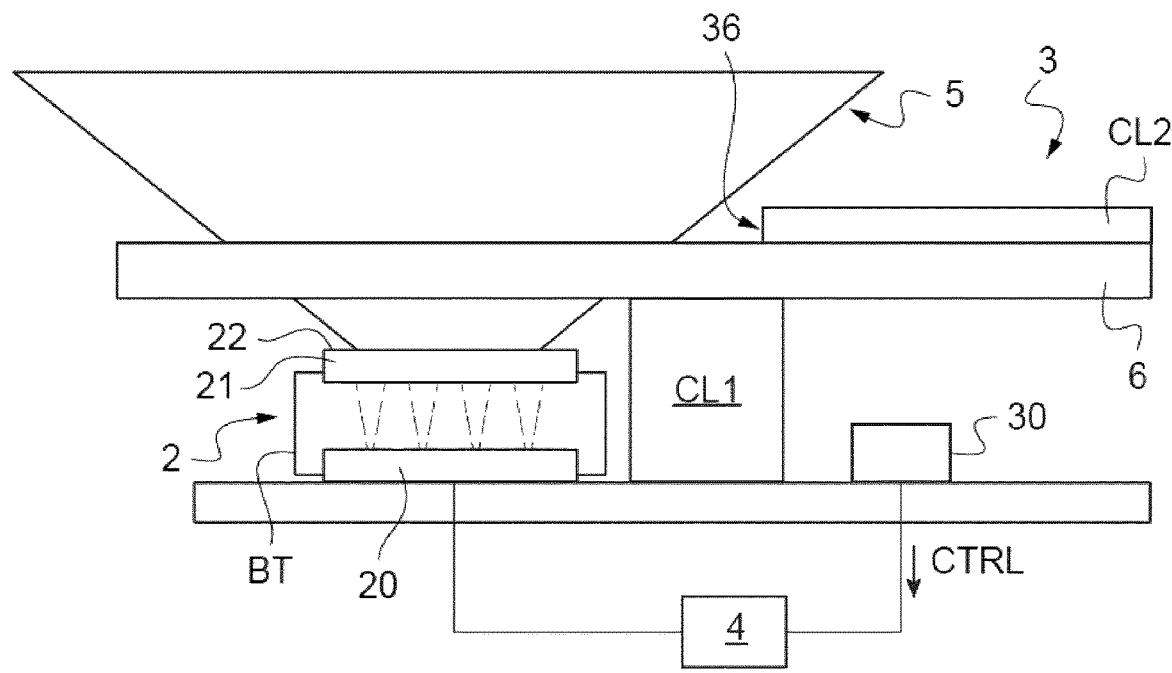
[Fig. 6]
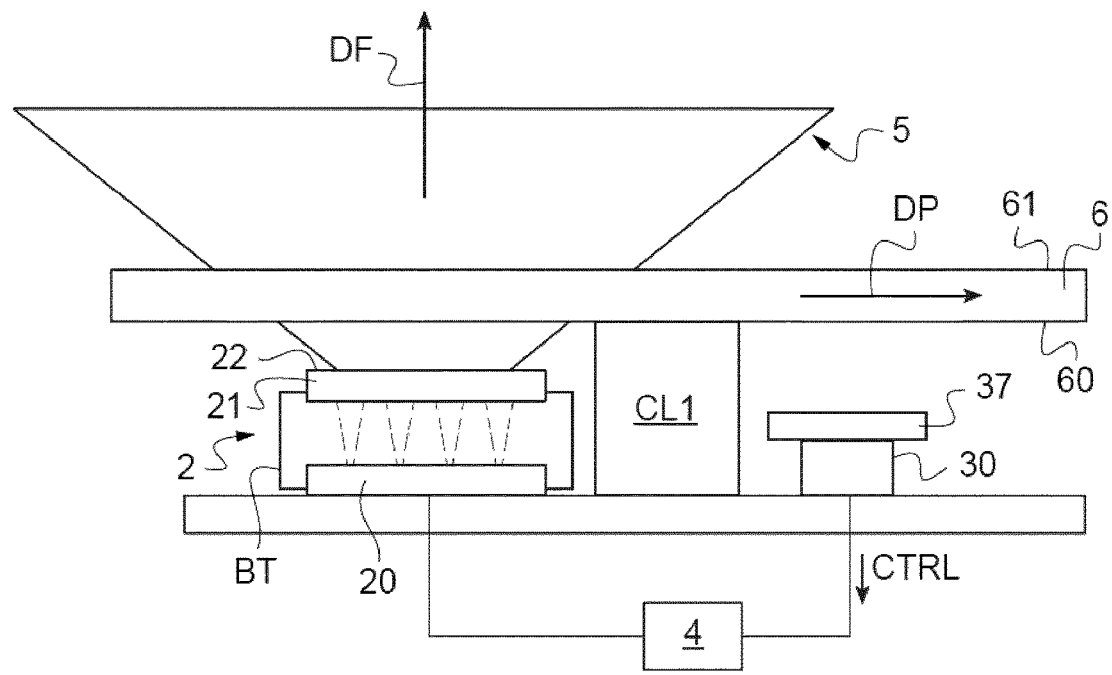

[Fig. 7]
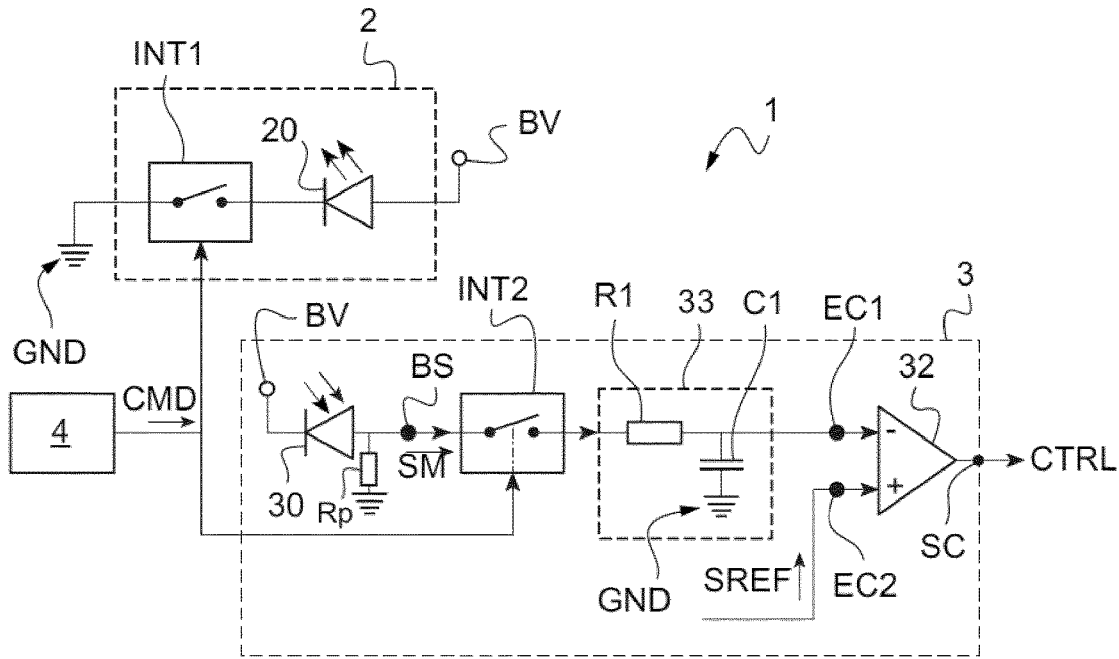
[Fig. 8]
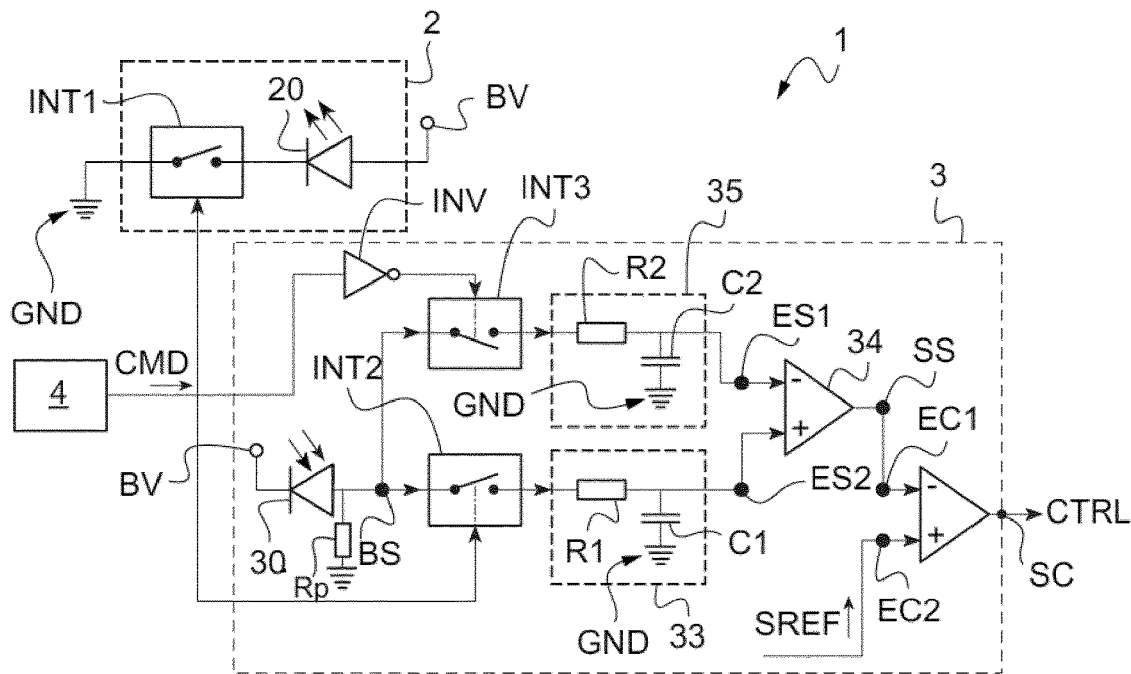

LIGHTING DEVICE AND IMAGING DEVICE COMPRISING SUCH A LIGHTING DEVICE

TECHNICAL FIELD

The present invention relates to the technical field of imaging, and in particular to image capture using an illuminator.

More specifically, the invention relates to a lighting device and an imaging device comprising such a device, for example, that is adapted to, but is not limited to, capturing an image in the passenger compartment of a motor vehicle.

TECHNOLOGICAL BACKGROUND

The term imager is understood herein to mean any device allowing images to be captured that are either two-dimensional images, such as, for example, photos or videos, or three-dimensional images, such as those captured by an imager implementing techniques referred to as time-of-flight measurement techniques.

It is known for an imager to be coupled to a lighting device in order to maintain sufficient brightness independently of the ambient brightness, or even in order to generate light pulses necessary for implementing the time-of-flight measurement techniques.

In order to avoid disturbing the persons present in the vicinity of the imager, it is known for infrared light sources to be used that emit light beams invisible to the human eye. However, the infrared sources could, under certain conditions, present a risk for the human eye as soon as their intensity becomes too high, especially since they do not trigger a protective reflex in the persons subjected to infrared illumination.

Conventionally, the light sources of the lighting devices for imagers, in particular the infrared light sources, are coupled to a diffuser providing the dual function of increasing the angular spread and of reducing the light intensity of the light beam emitted by the source and passing through the diffuser. Thus, in the lighting devices, it is worthwhile configuring the light source so that it generates a light beam having a high intensity in order to maintain a sufficient light intensity downstream of the diffuser relative to the direction of propagation of the beam.

A risk for the human eye occurs as soon as the diffuser is defective, for example, is absent or broken.

Existing solutions for responding to the risk of failure of the diffuser involve securely fixing the diffuser, for example, by means of a dedicated chassis, protecting it using a housing, and/or using a presence detector for the diffuser allowing the light source to be cut if the diffuser is not detected.

However, these solutions do not allow certain types of damage experienced by the diffuser to be prevented, such as thermal damage, for example, exposure to extreme heat, which can alter its internal structure and therefore its functions of diffusing and of reducing light intensity without altering its external structure.

Furthermore, such solutions require the use of bulky means, which is contrary to the current trend of miniaturizing imaging devices.

Therefore, a requirement exists for a lighting device that is space-saving and safe for the human eye.

SUMMARY OF THE INVENTION

According to one aspect, a lighting device is proposed comprising a lighting module comprising an optical output configured to emit a light beam having an angular spread, the lighting module comprising a light source and an optical diffuser, the light source being configured to generate said light beam, the optical diffuser being arranged to receive the light beam and to diffuse it toward the optical output so that the angular spread has, downstream of the diffuser relative to the direction of propagation of the light beam, a downstream value that is greater than an upstream value of the angular spread upstream of the diffuser.

According to a general feature of this aspect, the device comprises a control module configured to transmit a control signal having an alarm value when the value of the angular spread of the light beam emitted by the optical output falls below a first predetermined threshold, the control module comprising a photoreceptor optically coupled to the optical output and configured to measure a light intensity, the control module being configured to deliver the control signal having the alarm value when the value of the light intensity is less than or equal to a second predetermined threshold, the device further comprising a control circuit configured to deactivate the light source upon receiving the control signal having the alarm value.

The angular spread of a light beam in this case, and throughout the remainder of the description, is understood to mean the angle of divergence of the beam relative to its propagation axis, i.e., in this case relative to a direction normal to the diffuser.

Thus, by detecting a reduction in the angular spread of the light beam output from the diffuser, a consequence of a failure of the diffuser is detected independently of the cause. The detection of the failure is therefore reliable and the device is thus safer than those of the prior art.

According to one embodiment, the control module comprises a waveguide that has a direction of propagation transverse to the beam and that is configured to optically couple the optical output and the photoreceptor.

Thus, a smaller angular spread will result in a smaller angle of incidence of the rays on the walls of the waveguide, and, therefore, a greater number of reflections in the waveguide. The losses in the waveguide due to the successive reflections are therefore higher and the light intensity at the optical input is lower. Therefore, it is possible to easily and reliably detect a failure of the diffuser. Furthermore, the use of a waveguide allows part of the control module to be kept separate from the light beam and therefore allows excessive obstruction of the beam by the control module to be avoided.

According to one production possibility of this embodiment, the device comprises a protective window configured to be traversed by the light beam, the waveguide comprising at least one portion of the protective window. The waveguide comprises, for example, two opposite partially reflective walls of the protective window. It should be noted that a failure of said portion of the protective window can be detected by the device.

Thus, the use of a waveguide and of a separate protective window is dispensed with. Therefore, the device is advantageously less bulky. Furthermore, dispensing with a separate waveguide allows an additional obstruction of the beam by the waveguide to be avoided.

The control circuit can be configured to deliver a control pulse signal having either a first state or a second state, with the light source being configured to generate the light beam when the control pulse signal assumes the first state and to be deactivated when the control pulse signal assumes the second state.

A pulsed control of the light source is particularly suitable for implementing time-of-flight measurement techniques.

The photoreceptor can comprise a signal terminal configured to deliver a measurement signal representing the light intensity, the control module comprising a comparator comprising a first comparator input electrically coupled to the signal terminal, a second comparator input configured to receive a reference signal, the value of which represents the second threshold and a comparator output configured to deliver the control signal having the alarm value if the value of the signal on the first comparator input is less than or equal to the value of the signal on the second comparator input.

The signal terminal can be coupled to the first comparator input by means of a memory circuit configured to maintain the value of the measurement signal between two successive presentations of the first state of the control pulse signal.

Thus, the values of the measurement signal are excluded from the detection when the light source does not generate the beam. The detection is thus more accurate and the device more reliable.

The signal terminal can be coupled to the first comparator input by means of a subtractor configured to deliver a differential signal to the first comparator input, with the value of the differential signal being equal to the difference between the value of the measurement signal when the control pulse signal assumes the first state and the value of the measurement signal when the control pulse signal assumes the second state.

Therefore, a temporal filtering operation is carried out, advantageously allowing the detection of the components of the signal representing the ambient light to be excluded. The device is thus more reliable.

A bandpass filter can be interposed between the photoreceptor and the optical output.

An optical bandpass filter is a simple means of carrying out the filtering and making the device more reliable.

The control module can comprise at least one opaque isolation partition protecting it from ambient light.

The light source can comprise at least one vertical cavity surface emitting laser diode.

Vertical cavity surface emitting laser diodes (commonly referred to by a person skilled in the art using the acronym VCSEL (Vertical Cavity Surface Emitting Laser)) have a very low temperature drift and allow a beam to be generated in a very narrow wavelength band, which, particularly when the control module comprises a narrow bandpass filter, allows good immunity to ambient light.

Furthermore, the capacity of the VCSEL diodes to generate short pulses allows the peak power of the pulses to be increased and therefore allows the signal-to-noise ratio to be increased, which is particularly advantageous for implementing time-of-flight methods.

According to another aspect, an imaging system is proposed comprising an image capture device and a lighting device according to the invention.

The various features, alternative embodiments and embodiments of the invention can be associated with each other according to various combinations insofar as they are not incompatible or exclusive from one another.

BRIEF DESCRIPTION OF THE FIGURES

Furthermore, various other features of the invention become apparent from the accompanying description that is provided with reference to the drawings, which illustrate non-limiting embodiments of the invention and in which:

FIG. 1 is a schematic representation of a structural perspective of a lighting device according to one embodiment of the invention;

FIG. 2 is a schematic representation of the lighting device of FIG. 1 in which the diffuser of the lighting module is defective;

FIG. 3 is a schematic representation of a structural perspective of the lighting device according to an alternative embodiment of the invention in which the control module does not comprise a waveguide;

FIG. 4 is a schematic representation of a structural perspective of an imaging system according to one embodiment of the invention;

FIG. 5 is a schematic representation of a structural perspective of another alternative embodiment of the lighting device according to the invention in which the control module is protected by an opaque partition;

FIG. 6 is a schematic representation of a structural perspective of another alternative embodiment of the lighting device according to the invention in which the control module comprises an optical bandpass filter;

FIG. 7 is a schematic representation of an electrical perspective of the lighting device according to the invention; and FIG. 8 is a schematic representation of an electrical perspective of the lighting device according to one embodiment of the invention.

It should be noted that in these figures the structural and/or functional elements common to various alternative embodiments can have the same reference signs.

DETAILED DESCRIPTION

A lighting device according to the invention, as schematically shown in FIG. 1 and designated as a whole using reference 1, comprises a lighting module 2, a control module 3 optically coupled to the lighting module and a control circuit 4 electrically coupled to the lighting module 2 and to the control module 3.

The lighting module 2 comprises an optical output 22 configured to deliver a light beam 5, a light source 20 and a diffuser 21. The light source 20 is configured to generate the light beam 5 and the diffuser 21 is arranged so as to receive it and deliver it to the optical output 22. These elements of the lighting module 2 are, in this example, housed in a housing BT.

In this case, the housing BT comprises an orifice, in which the diffuser 21 is housed. Thus, the optical output 22 is formed by a face of the diffuser 21. As an alternative embodiment, the diffuser could be positioned upstream of the optical output relative to the direction of propagation of the beam 5. In this case, the orifice of the housing BT acts as an optical output.

The diffuser 21 is configured to increase the value of the angular spread of the beam and to reduce the intensity thereof. Thus, upstream of the diffuser relative to the direction of propagation of the beam 5, the beam 5 has an angular spread having an upstream value $\theta_1$, in this case equal to 10°. Downstream of the diffuser, the light beam 5 has an angular spread having a downstream value $\theta_2$ that is greater than the upstream value $\theta_1$, with the downstream value $\theta_2$ in this case being equal to 50°.

The light source 20 in this case is in the form of a matrix array of light-emitting diodes produced on a printed circuit board. The light-emitting diodes in this case are VCSEL diodes configured to generate the beam 5 in a spectral band ranging between 800 nanometers and 1,000 nanometers.

The control module 3 in this case is configured to transmit a control signal CTRL to the control circuit, with said control signal CTRL having either a neutral value, for example, a low state, or an alarm value, for example, a high state, and to detect an abnormal decrease in the angular spread of the light beam 5, i.e., a passage below a first predetermined threshold of the value of the angular spread. In the event of detection, the control module 3 generates the control signal CTRL having the alarm value; otherwise, the control module 3 generates the control signal CTRL having the neutral value.

To this end, the control module 3 comprises a photoreceptor 30 optically coupled to the optical output 22 and configured to measure a light intensity. The control module 3 in this case is configured to generate the control signal having the alarm value when the value of the light intensity measured by the photoreceptor 30 crosses a second predetermined threshold. In this case, the value of the second predetermined light intensity threshold represents the value of the first predetermined angular spread threshold, i.e., it is directly related to this value, as will be seen hereafter.

In this embodiment, the photoreceptor 30 is optically coupled to the optical output 22 by means of a waveguide 6 having a direction of propagation DP transverse to the light beam 5, and in particular, in this example, a direction of propagation DP orthogonal to the direction of propagation DF of the beam 5. A first opaque partition CL1 in this case is located between the photoreceptor 30 and the lighting module 2 so that the photoreceptor 30 is optically coupled to the lighting module 2 by means of the waveguide 6 only.

In this case, the waveguide 6 is formed by a protective window located downstream of the lighting module 2 (on the path of the light beam 5) so as to be crossed by the beam 5. The protective window also extends above the photoreceptor 30 so that the lighting module 2 and the photoreceptor 30 are located on the same side of the protective window and are protected by the protective window.

The waveguide 6 is formed by a first partially reflective wall 60 and by a second partially reflective wall 61 that delimit the protective window 6. A portion of the rays of the beam 5 that does not pass through the partially reflective walls 60 and 61 is successively reflected onto the walls 60 and 61 so as to propagate in the direction of propagation DP.

By way of an example, the path of a first peripheral ray 50 of the beam 5 located on the periphery of the beam 5 is shown. The first peripheral ray 50 is guided from the optical output 22 to the photoreceptor 30 through the waveguide 6. The first peripheral ray 50 therefore passes through the first partially reflective wall 60 twice, but never completely passes through the second partially reflective wall 61.

It should be noted in this case that, since the walls 60 and 61 are partially reflective, each reflection against either of the walls leads to optical losses through the corresponding wall, and reciprocally each time the wall is crossed this causes optical losses by reflection.

Furthermore, since the first peripheral ray 50 is located on the edge of the beam 5, it has a maximum angle of divergence relative to the direction of propagation of the beam 5, and therefore a maximum angle of incidence on the partially reflective walls 60 and 61. Thus, for a given distance travelled in the waveguide 6, the first peripheral ray 50 will experience fewer reflections than a light ray having a smaller angle of divergence relative to the direction of propagation of the beam 5. In this case, the first peripheral ray 50 experiences three reflections, only one of which is on the first peripheral wall 60.

With each reflection on the partially reflective walls 60 and 61 causing optical losses through said walls, the light intensity measured by the photoreceptor 30 is proportional to the number of reflections experienced by the peripheral beam 50, and therefore to the angular spread of the beam 5. Thus, the lower the angular spread of the beam 5, the lower the light intensity measured by the photoreceptor 30.

Thus, as mentioned above, the value of the measured light intensity represents the value of the angular spread, and the value of the second predetermined light intensity threshold represents the first predetermined angular spread threshold.

In this case, the control module 3 is configured to generate the control signal CTRL having the alarm value when the value of the light intensity is less than the second predetermined threshold.

The control circuit 4 is configured to deactivate the light source upon receiving the control signal CTRL having the alarm value. For example, the control circuit 4 can be configured to disconnect the light source 20 from its electric power supply, as will be seen hereafter.

FIG. 2 illustrates a configuration of the device 1 in which the diffuser 21 is defective, in this case absent. Therefore, in this case, the angular spread assumes the upstream value even at the optical output 22.

The path of a second peripheral ray 51 originating from the edge of the beam 5 having the upstream angular spread value is shown. The ray is reflected onto the partially reflective walls 60 and 61 with a smaller angle of incidence and therefore experiences a greater number of reflections, in this case 19 reflections, and therefore greater optical losses. Thus, the second peripheral ray 50 reaches the photoreceptor 30 with a light intensity that is lower than the second predetermined threshold. The control module therefore transmits the control signal CTRL having the alarm value to the control circuit 4, which then deactivates the light source 20.

The device described herein with reference to FIGS. 1 and 2 comprises a light source comprising a matrix array of VCSEL diodes. However, this embodiment of the light source is not limiting and the light source could be different. In particular, the light source can comprise only one diode. The light source particularly can be of a different type, for example, comprising one or more laser sources that are not of the VCSEL type, such as Edge Emitting Laser Diodes, Fabry-Perot type laser diodes, Distributed FeedBack (DFB) lasers, or even one or more light sources that are not light-emitting diodes, such as filament lamps, discharge lamps, or even fluorescent tubes.

In particular, the light source can be configured to deliver a light beam having an upstream value different from that mentioned above. For example, the upstream value of the angular spread can range between 1° and 20°.

The downstream angular spread value, which depends on the configuration of the diffuser and on the upstream angular spread value, can range between 30° and 100°.

The device described above comprises a waveguide formed by a partially transparent protective window, which advantageously allows the bulk of the device to be reduced. However, alternative embodiments of the invention that comprise a waveguide distinct from the protective window, for example, an optical fibre, can be contemplated. In particular, the invention covers alternative embodiments of the device without protective windows.

FIG. 3 illustrates an alternative embodiment of the invention, in which the control module 3 does not comprise a waveguide, and in which the photoreceptor 30 is directly optically coupled to the optical output 22. In this case, the photoreceptor 30 is placed on the periphery of the beam 5.

Thus, in the event of a reduction in the angular spread, i.e., in the event of failure of the diffuser 21, the photoreceptor 30 is no longer illuminated by the beam 5 having the upstream divergence value and the value of the light intensity that it receives falls below the second threshold. The control circuit 4 then deactivates the light source.

The device according to this embodiment comprises a protective window 65 not acting as a waveguide but that is simply used to protect the device 1.

An imaging system according to the invention is illustrated in FIG. 4 and is designated as a whole using reference 7. The imaging system 7 in this case comprises an image capture device 70, in this case a camera supported by a chassis 71, and a lighting device 1 as described above with reference to FIGS. 1 and 2. The lighting device 1 is configured to illuminate a scene to be captured, for example, in this case the passenger compartment of a vehicle, and the camera 70 is configured to capture the illuminated scene. For example, the images captured by the camera 70 are processed by an image processing circuit (not shown) for driving assistance purposes.

As an alternative embodiment, the imaging device 7 can comprise, as an imaging device, a system for capturing three-dimensional images and the lighting device is then configured to emit the light beam in a pulsed manner, in order to capture a three-dimensional image, in particular by implementing techniques referred to as time-of-flight measurement techniques FIG. 5 illustrates an alternative embodiment of the invention, in which the lighting device described above with reference to FIGS. 1 and 2 further comprises a second opaque partition CL2 protecting the control module 3 from ambient light.

The second opaque partition CL2 is disposed on a portion of the protective window opposite the photoreceptor 30.

For example, the first opaque partition CL1 and the second opaque partition CL2 in this case form the walls of a housing that isolates the photoreceptor 30 from ambient light and which has an opening 36 traversed by the protective window, i.e., by the waveguide 6.

According to an alternative embodiment illustrated in FIG. 6, a bandpass filter 37 is interposed between the photoreceptor 30 and the optical output 22. In this case, the bandpass filter 37 is configured to allow through light rays, the wavelength of which is located in the emission spectrum of the light source, taking into account all the variations related to this source (manufacturing tolerances, temperature variation, variation of the angle of incidence), and to reflect or absorb the light rays outside this range of values. In this example, the bandpass filter 37, combined with the light source 20 in this case being a VCSEL-type laser, is configured to allow through the light rays in a band of 50 nm to 20 nm around the central wavelength of the VCSEL. The bandpass filter 37 in this case is produced by a succession of thin layers of materials with variable indices on a glass support.

FIG. 7 schematically illustrates, and from an electrical perspective, the device 1 according to the invention, and particularly the lighting module 2, the control module 3 and the control circuit 4.

The light source 20 in this case is symbolically shown by a light-emitting diode coupled between a power supply terminal BV configured to receive a power supply voltage, for example, in this case a voltage of a few volts, and a reference terminal GND, for example, in this case the ground.

The photoreceptor 30 in this case is symbolically shown by a photodiode, the cathode of which is coupled to the power supply terminal BV and the anode of which forms a signal terminal BS configured to deliver a measurement signal SM representing the light intensity measured by the photoreceptor 30. A protective resistor Rp is coupled between the anode and the cathode of the photodiode 30.

The control module 3 further comprises a comparator 32 comprising a first comparator input EC1, a second comparator input EC2, and a comparator output SC configured to deliver the control signal CTRL.

The signal terminal BS in this case is coupled to the first comparator input EC1 by means of a first memory circuit 33. The first memory circuit in this case is a circuit RC comprising a first resistor R1, coupled between the signal terminal BS and the first comparator input EC1, and a first capacitor C1, coupled between the first comparator input EC1 and the reference terminal GND. A person skilled in the art will select the values of the resistor R1 and of the capacitor C1 so as to form a low-pass filter adapted to the modulation or activation frequency of the illuminator. For example, for a modulation of a TOF (Time-Of-Flight) type sensor at 25 MHz, a cut-off frequency of 5 MHz will be selected. This is in order to prevent the output SC of the comparator 32 from changing state for each light pulse.

The second comparator input is configured to receive a reference signal SRF representing the value of the second predetermined threshold and the comparator 32 is configured to deliver the control signal CTRL having the neutral value when the value of the signal on the first comparator input EC1 is greater than the value of the reference signal SRF and to deliver the control signal CTRL having the alarm value when the value of the signal on the first comparator input EC1 is less than or equal to the value of the reference signal SRF.

The control circuit 4 is configured to generate a control signal CMD assuming either a first state, in this case a high state (for example, a few volts), or a second state, for example, in this case a low state corresponding to a value of 0 volts.

The light source 20 is coupled to the reference terminal GND by means of a first switch INT1 voltage controlled by the control signal CMD. The first switch INT1 is configured to be closed when the control signal CMD assumes the first state and open when the control signal CMD assumes the second state. Thus, the electric power supply of the light source 20, and therefore the emission of the light beam 5, are controlled by the control signal CMD.

The signal terminal BS is coupled to the first memory circuit 33 by means of a second voltage-controlled switch INT2 and is configured to be closed when the control signal CMD assumes the first state and open when the control signal assumes the second state. Thus, the control circuit 4 is configured to deactivate the photo-detection when the light source 20 does not emit the light beam 5.

In the illustrated embodiment, the control signal CMD is a pulse signal, for example, having a duty cycle equal to 50%. The light beam 5 is therefore emitted in a pulsed manner and the lighting device 1 is particularly suitable for capturing images by implementing a time-of-flight method.

Furthermore, the memory circuit 33 is configured to maintain the value of the measurement signal SM between two successive presentations of the high state of the control signal CMD. In this example, the time constant of the first circuit RC of the first memory circuit 33 is equal to at least 5 times the period of the control pulse signal CMD and the value of the measurement signal SM is maintained with a tolerance of less than 1%.

The control circuit 4 is configured to continuously deliver the control signal CMD assuming the second state when the control signal has the alarm value.

FIG. 8 illustrates an alternative embodiment of the device as described above with reference to FIG. 7, in which the control module further comprises a subtractor 34 and a second memory circuit 35.

The subtractor comprises a first subtractor input ES1, a second subtractor input ES2 and a subtractor output SS configured to deliver a differential signal, the value of which is equal to the difference of the value of the signal on the first subtractor input ES1 and the value of the signal on the second subtractor input ES2.

The first subtractor input ES1 is coupled to the signal terminal BS by means of the second memory circuit 35. The second memory circuit 35 comprises a second circuit RC, a second resistor R2 of which is coupled between the signal terminal BS and the first subtractor input ES1 and a second capacitor C2 of which is coupled between the first subtractor input ES1 and the reference terminal GND. A person skilled in the art will select the values of the resistor R2 and of the capacitor C2 so as to form a low-pass filter relative to the modulation or activation frequency of the illuminator in the same manner as for the resistor R1 and the capacitor C1. For example, for a modulation of a TOF type sensor at 25 MHz, a cut-off frequency of 5 MHz will be selected.

The signal terminal BS is coupled to the second memory circuit 35 by means of a third voltage-controlled switch INT3 configured to be open when the control signal CMD assumes the first state and closed when the control signal CMD assumes the second state. For example, in this case, the third switch INT3 is configured to receive the control signal by means of a gate inverter INV.

Thus, the subtractor output SS is configured to deliver a differential signal to the first comparator input, with the value of the differential signal being equal to the difference between the value of the measurement signal when the control pulse signal assumes the first state and the value of the measurement signal when the control pulse signal assumes the second state, i.e., a signal in which the component representing ambient light has been eliminated.

Various other modifications can be made to the invention within the scope of the appended claims. For example, even though the embodiments of FIGS. 7 and 8 are illustrated by analogue circuits, the invention is perfectly compatible with digital technologies, for example, involving integrated electronic circuits.

The invention claimed is:

1. A lighting device comprising a lighting module comprising:
   an optical output configured to emit a light beam having an angular spread, the module comprising a light source;
   an optical diffuser, the light source being configured to generate said light beam, the optical diffuser being arranged to receive the light beam and to diffuse it toward the optical output so that the angular spread has, downstream of the diffuser relative to the direction of propagation of the light beam, a downstream value that is greater than an upstream value of the angular spread upstream of the diffuser;
   a control module configured to transmit a control signal having an alarm value when the value of the angular spread of the light beam emitted by the optical output falls below a first predetermined threshold, the control module comprising a photoreceptor optically coupled to the optical output and configured to measure a light intensity, the control module being configured to deliver the control signal having the alarm value when the value of the light intensity is less than or equal to a second predetermined threshold;
   a control circuit configured to deactivate the light source upon receiving the control signal having the alarm value.

2. The device as claimed in claim 1, wherein the control module comprises a waveguide that has a direction of propagation transverse to the beam and that is configured to optically couple the optical output and the photoreceptor.

3. The device as claimed in claim 2, comprising a protective window configured to be traversed by the light beam, the waveguide comprising at least one portion of the protective window.

4. The device as claimed in claim 1, wherein the control circuit is configured to deliver a control pulse signal having either a first state or a second state, with the light source being configured to generate the light beam when the control pulse signal assumes the first state and to be deactivated when the control pulse signal assumes the second state.

5. The device as claimed in claim 4, wherein the photoreceptor comprises a signal terminal configured to deliver a measurement signal representing the light intensity, the control module comprising a comparator comprising a first comparator input electrically coupled to the signal terminal, a second comparator input configured to receive a reference signal, the value of which represents the second threshold and a comparator output configured to deliver the control signal having the alarm value if the value of the signal on the first comparator input is less than or equal to the value of the signal on the second comparator input.

6. The device as claimed in claim 5, wherein the signal terminal is coupled to the first comparator input by a memory circuit configured to maintain the value of the measurement signal between two successive presentations of the first state of the control pulse signal.

7. The device as claimed in claim 5, wherein the signal terminal is coupled to the first comparator input by subtractor configured to deliver a differential signal to the first comparator input, with the value of the differential signal being equal to the difference between the value of the measurement signal when the control pulse signal assumes the first state and the value of the measurement signal when the control pulse signal assumes the second state.

8. The device as claimed in claim 1, wherein an optical bandpass filter is interposed between the photoreceptor and the optical output.

9. The device as claimed in claim 1, wherein the control module comprises at least one opaque isolating partition protecting it from ambient light.

10. The device as claimed in claim 1, wherein the light source comprises at least one vertical cavity surface emitting laser diode.

11. An imaging system comprising an image capture device and a lighting device as claimed in claim 1.

* * * * *